United States Patent
Ogawa et al.

(10) Patent No.: US 10,365,485 B2
(45) Date of Patent: Jul. 30, 2019

(54) DISPLAY DEVICE FOR VEHICLE AND VEHICLE

(71) Applicant: YAZAKI CORPORATION, Tokyo (JP)

(72) Inventors: Takayuki Ogawa, Shizuoka (JP); Tetsuya Sugiyama, Shizuoka (JP); Takuma Ogisu, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/804,754

(22) Filed: Jul. 21, 2015

(65) Prior Publication Data
US 2016/0025976 A1  Jan. 28, 2016

(30) Foreign Application Priority Data
Jul. 24, 2014 (JP) .................................. 2014-150509
May 15, 2015 (JP) .................................. 2015-100081

(51) Int. Cl.
*G02B 27/01* (2006.01)

(52) U.S. Cl.
CPC .. *G02B 27/0149* (2013.01); *G02B 2027/0161* (2013.01)

(58) Field of Classification Search
CPC .................... G02B 27/0149; G02B 2027/0161
USPC ........................................................ 359/630
See application file for complete search history.

(56) References Cited

U.S. PATENT DOCUMENTS

| 2009/0278677 | A1  | 11/2009 | Arie et al. |
| 2011/0175798 | A1* | 7/2011  | Sato ........................ B60K 35/00 345/7 |
| 2013/0176335 | A1* | 7/2013  | Sugiyama .............. B60K 35/00 345/633 |

FOREIGN PATENT DOCUMENTS

| CN | 101253067 A     | 8/2008  |
| CN | 201347033 Y     | 11/2009 |
| JP | S6390445 A      | 4/1988  |
| JP | 2003300426 A    | 10/2003 |
| JP | 2005082103 A    | 3/2005  |
| JP | 2012-056335 A   | 3/2012  |
| WO | 2012/029941 A1  | 3/2012  |

OTHER PUBLICATIONS

Communication dated Mar. 27, 2017, from the State Intellectual Property Office of the P.R.C., in counterpart Chinese application No. 201510434642.7.
Communication dated Sep. 20, 2017 from the State Intellectual Property Office of the P.R.C. in counterpart application No. 201510434642.7.
Communication dated Feb. 12, 2018 from the State Intellectual Property Office of the P.R.C. in counterpart application No. 201510434642.7.

(Continued)

*Primary Examiner* — Evan P Dzierzynski
*Assistant Examiner* — Mitchell T Oestreich
(74) *Attorney, Agent, or Firm* — Sughrue Mion, PLLC (57) ABSTRACT

A display device for a vehicle includes an irradiation unit that projects, through an opening provided to an instrument panel, display light onto a windshield located above the opening; and a display panel that is disposed on an opening side surface extending from an opening peripheral part toward a lower part of the instrument panel and that displays information to a driver.

19 Claims, 4 Drawing Sheets

(56) References Cited

OTHER PUBLICATIONS

Communication dated Dec. 3, 2018 from the State Intellectual Property Office of the P.R.C. in application No. 201510434642.7.
Communication dated Aug. 9, 2018 from the State Intellectual Property Office in the P.R.C. in counterpart application No. 201510434642.7.
The Fifth Office Action dated May 13, 2019, issued in Chinese Application No. 201510434642.7, 17 pages in English and Chinese.

* cited by examiner

DISPLAY DEVICE FOR VEHICLE AND VEHICLE

CROSS-REFERENCE TO RELATED APPLICATION(S)

The present application claims priority to and incorporates by reference the entire contents of Japanese Patent Application No. 2014-150509 filed in Japan on Jul. 24, 2014 and Japanese Patent Application No. 2015-100081 filed in Japan on May 15, 2015.

BACKGROUND OF THE INVENTION

1. Field of the Invention

The present invention relates to a display device for a vehicle and to a vehicle.

2. Description of the Related Art

Conventionally, a head-up display device (hereinafter referred to as a "HUD device") is proposed as a display device for a vehicle. The HUD device is capable of displaying information so as to overlap outer scenery, thereby reducing the movement of the line of sight of a driver and increasing the visibility of information during driving (see, for example, Japanese Patent ApplicationLaid-open No. 2012-56335). The HUD device includes an irradiation unit that emits display light. Display light emitted by the irradiation unit is projected onto a reflection member (e.g., a windshield or a combiner), whereby the driver can view a virtual image (information displayed by the display light) appearing in a vehicle forward direction from the reflection member.

In general, the irradiation unit is disposed inside an instrument panel that partitions the front part of a vehicle interior space. Accordingly, the irradiation unit emits display light toward the reflection member through an opening provided to the instrument panel. An opening side surface is provided so as to extend from the periphery of the opening toward the inside of the instrument panel so that the inside is not exposed through the opening.

In recent years, there is an increasing trend in the amount of information presented to a driver. Because the width of irradiation of display light is becoming wider accordingly, an opening provided to an instrument panel is also becoming larger. As a result, an opening side surface that is visible in the opening is further noticeable than before, thereby undesirably deteriorating vehicle interior design.

SUMMARY OF THE INVENTION

The present invention has been made in view of the above problem, and an object of the present invention is to provide a display device for a vehicle that is capable of displaying a larger amount of information to a driver without deteriorating the vehicle interior design.

Another object of the present invention is to provide a vehicle that is good in terms of the vehicle interior design.

In order to achieve the above mentioned object, a display device for a vehicle according to one aspect of the present invention includes an irradiation unit configured to project display light onto a reflection member through an opening facing the reflection member so as to display information to a driver; and a display section configured to be disposed on an opening side surface provided along an opening peripheral part and display information to the driver.

In the one aspect of the present invention, it is preferable that the opening is formed to an instrument panel. In this case, it is desirable that the irradiation unit is disposed inside the instrument panel and project the display light onto the reflection member located above the opening so as to display the information to the driver. In addition, it is preferable that the opening side surface extend from the opening peripheral part or from a range within a certain distance from the opening peripheral part as a base point toward a lower part of the instrument panel.

Furthermore, in the one aspect of the present invention, it is preferable that the opening peripheral part further include a hood that covers upper part of the display section.

Furthermore, in the one aspect of the present invention, it is preferable that the opening side surface have a groove formed in a recessed shape; and the display section is disposed on a position penetrated in a depth direction of the groove. In this case, it is desirable that the hood be constituted by an upper wall of the groove.

Furthermore, in the one aspect of the present invention, it is preferable that an upper end of the opening peripheral part close to a front side of the vehicle be located higher than an upper end of the opening peripheral part close to a back side of the vehicle.

Furthermore, in the one aspect of the present invention, it is preferable that the display section displays detailed information representing details of displayed information in association with the displayed information projected by the display light from the irradiation unit.

Furthermore, in the one aspect of the present invention, it is preferable that the display section displays essential information among pieces of information on a state of the vehicle that is required to be displayed to the driver.

According to another aspect of the present invention, a vehicle includes a steering wheel configured to be operated by a driver; an instrument panel configured to be disposed in a vehicle forward direction than the steering wheel; an irradiation unit configured to project, through an opening formed to the instrument panel, display light onto a reflection member facing the opening so as to display information to the driver; and a display section configured to be disposed in a position close to a front side of the vehicle than the opening and display information to the driver.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
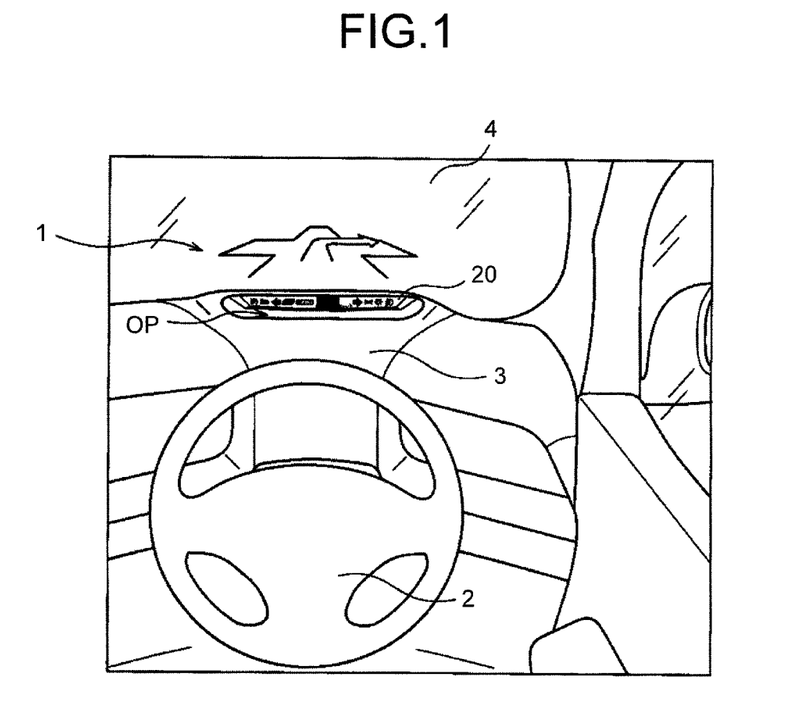
FIG. 1 is a schematic view illustrating an interior of a vehicle to which a display device for a vehicle is applied.
Figure 2:
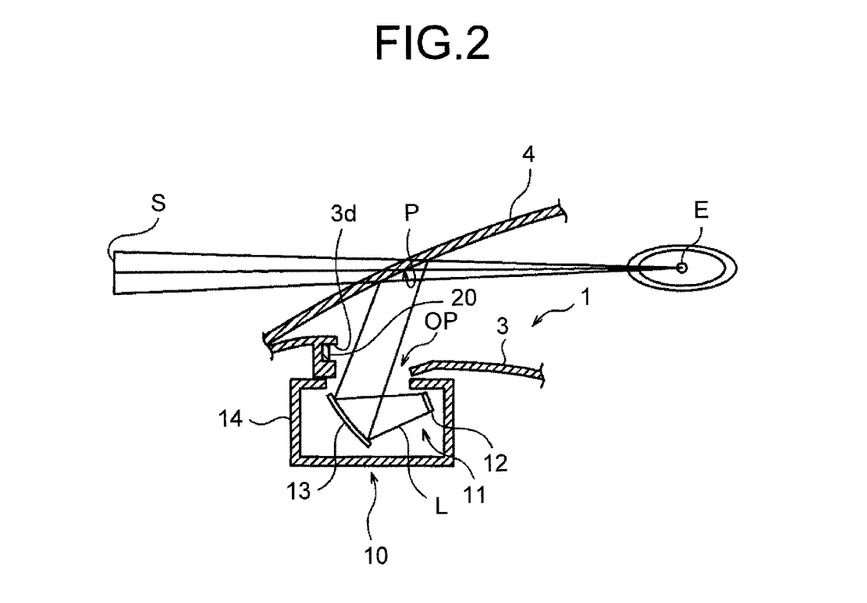
FIG. 2 is a cross-sectional view illustrating the interior of the vehicle to which the display device for a vehicle is applied.

FIG. 1 is a schematic view illustrating a vehicle interior to which a display device 1 for a vehicle according to the present embodiment is applied. FIG. 2 is a cross-sectional view illustrating the vehicle interior to which the display device 1 for a vehicle is applied. In the vehicle interior, a steering wheel 2 is disposed in front of the driver's seat, and an instrument panel 3 is disposed in a vehicle forward direction from the steering wheel 2. Furthermore, a windshield 4 that serves as a boundary between the vehicle interior and the outside of the vehicle is disposed in the vehicle forward direction from the instrument panel 3.

The instrument panel 3 is a member that partitions the front part of the vehicle interior and is formed in a required shape. An opening OP that passes through the instrument panel 3 is provided in a certain position in the instrument panel 3. The windshield 4 is located above the opening OP.

A HUD device 10 that displays information to a driver by distant display using a virtual image is mounted in the vehicle. The HUD device 10 is mainly made up of an irradiation unit 11 and forms a virtual image by using the windshield 4 that serves as a reflection member.

The irradiation unit 11 accommodated in a housing case 14 is disposed inside the instrument panel 3. The irradiation unit 11 includes a display unit 12 and an aspherical mirror 13.

The display unit 12 emits display light corresponding to displayed information to be presented to a driver. The display unit 12 includes an LCD (liquid crystal display) that displays information such as numerals and characters and a backlight such as an LED for illuminating the LCD. In the display unit 12, light emitted by the backlight passes through the LCD, the LCD displays information by this light, and the display light is delivered toward the aspherical mirror 13. The display unit 12 is controlled by a controller provided in the vehicle and displays required information.

The aspherical mirror 13 is a member that reflects, toward the windshield 4, display light emitted from the display unit 12. The aspherical mirror 13 is supported so that the inclination thereof is adjustable. The inclination of the aspherical mirror 13 can be adjusted by driving force of a motor (not illustrated).

The irradiation unit 11 projects display light L emitted from the display unit 12 onto a projection area P of the windshield 4 via the aspherical mirror 13. The projected display light L is reflected by the windshield 4 and reaches an eye point E of the driver. Thus the driver views a virtual image S of information displayed on the outside of the windshield 4 by the display light L.

Figure 3:
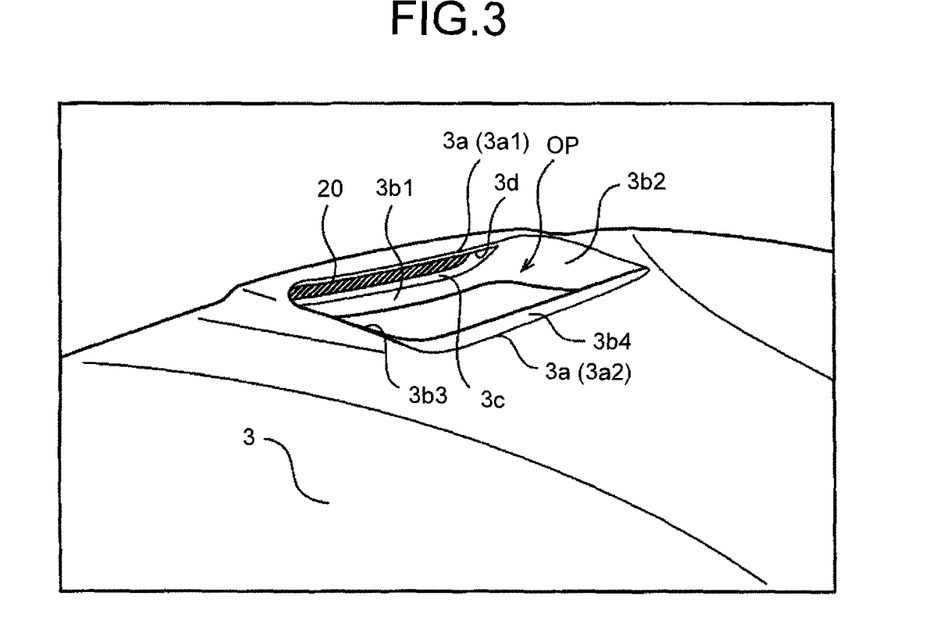
FIG. 3 is a perspective view illustrating a substantial part of an instrument panel around an opening.
Figure 4:
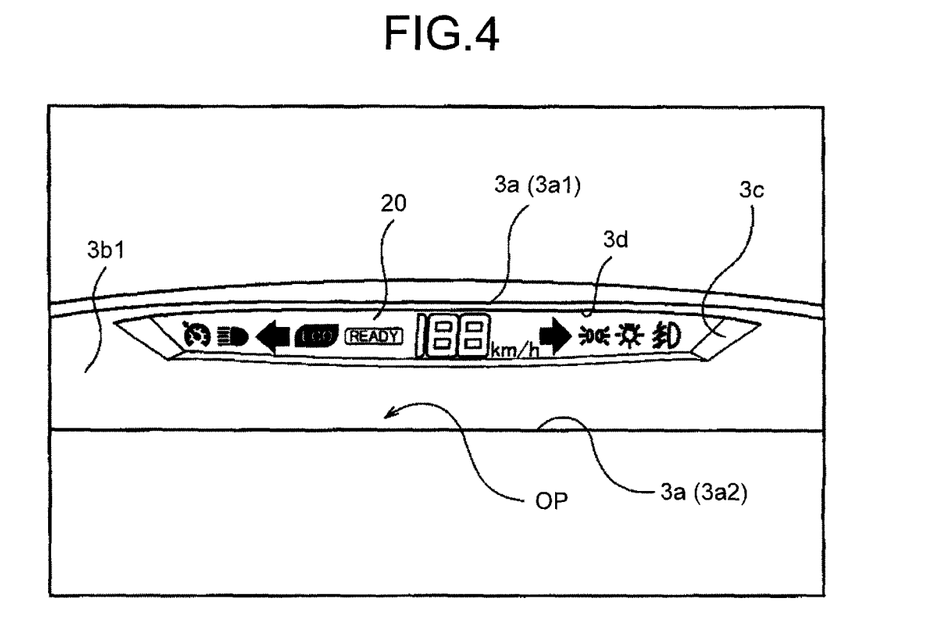
FIG. 4 is a front view schematically illustrating a display panel.

FIG. 3 is a perspective view illustrating a substantial part of the instrument panel 3 around the opening OP, and FIG. 4 is a front view schematically illustrating a display panel 20 that is a display unit 20. As described above, the opening OP for guiding the display light from the irradiation unit 11 toward the windshield 4 is provided in a certain position in the instrument panel 3. In the present embodiment, the opening OP has a quadrangular shape that is long in a vehicle width direction (right-and-left direction).

Opening side surfaces 3b1 to 3b4 are provided along an opening peripheral part 3a that is part of the instrument panel 3 and that surrounds the opening OP. Base ends of the opening side surfaces 3b1 to 3b4 are connected to the opening peripheral part 3a and extend from the opening peripheral part 3a toward a lower part of the instrument panel 3. The opening side surface 3b1 located close to the front side of the vehicle and the pair of opening side surfaces 3b2 and 3b3 each located in the right and left direction of the vehicle are vertical surfaces that are substantially upright, and the opening side surface 3b4 located close to the back side of the vehicle is an inclined surface that is gradually inclined.

A display panel 20 is provided on the opening side surface 3b1 close to the front side of the vehicle, i.e., the opening side surface 3b1 that faces the driver. The display panel 20 is disposed so that a display surface thereof is directed to a vehicle backward direction. A known display device such as an LCD can be used as the display panel 20. The display panel 20 displays required information under control of the controller provided in the vehicle.

The display device 1 for a vehicle according to the present embodiment includes a hood 3d that covers the display section 20 from above. To provide the hood 3d, a recessed groove 3c is provided to the opening side surface 3b1, and the display panel 20 is provided in the groove 3c. Specifically, the groove 3c has an opening having a substantially quadrangular shape that is long in a right-and-left direction so as to correspond to the shape of the display panel 20 and has a certain depth toward the front side of the vehicle. The depth of the groove 3c is set larger than the thickness of the display panel 20, and the display panel 20 is disposed in a deep part of the groove 3c in the depth direction of the groove 3c. The geometric effect of the groove 3c allows the display section 20 to be covered from above when the display panel 20 is disposed in the deep part of the groove 3c. That is, an upper wall of the groove 3c forms the hood 3d.

Figure 5:
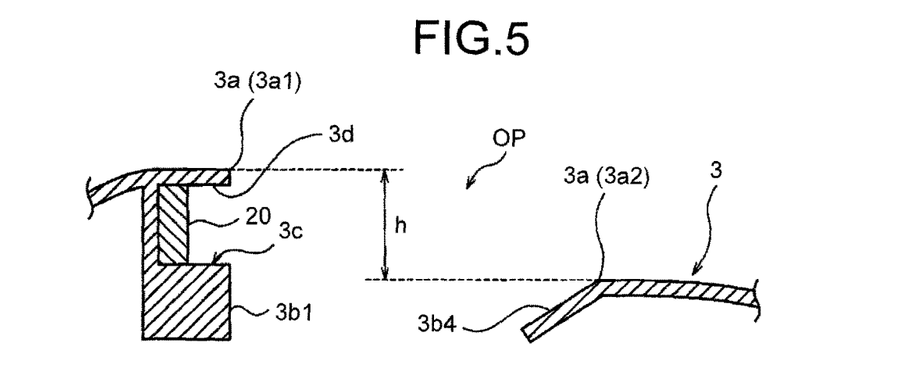
FIG. 5 is an explanatory view schematically illustrating a relation between heights of an opening peripheral part.

FIG. 5 is an explanatory view schematically illustrating a relation between the heights of the opening peripheral part. The opening peripheral part 3a has a shape such that the height at a portion thereof close to the front side of the vehicle is different from that at a portion thereof close to the back side of the vehicle. Specifically, of the opening peripheral part 3a, an upper end of an opening peripheral part 3a1 close to the front side of the vehicle is located higher than an upper end of an opening peripheral part 3a2 close to the back side of the vehicle. Because there is a difference (difference h) between the upper end of the opening peripheral part 3a1 close to the front side of the vehicle and the upper end of the opening peripheral part 3a2 close to the back side of the vehicle, the opening peripheral part 3a2 close to the back side of the vehicle is unlikely to obstruct the line of sight of the driver. Accordingly, even in a case where the eye point is located at the same height as the display panel 20 or located lower than the display panel 20, the driver can easily view the display panel 20 provided on the opening side surface 3b1. This arrangement can support various shapes of vehicle interiors and various physical sizes of drivers. Furthermore, it is possible to ensure flexibility in designing a vehicle interior.

However, the quality of the visibility depends on not only the difference in the height between the opening peripheral parts 3a1 and 3a2 but also the eye point of the driver and the shape of the vehicle interior. Therefore, providing a height difference between the opening peripheral parts 3a1 and 3a2 is an option. It is only necessary that the display panel 20 be disposed so that the display panel 20 is visible to the driver. In this case, because there are vehicles with various interior shapes and drivers with various physical sizes, it is preferable that the display panel 20 be disposed so as to meet a certain requirement, for example, the display panel 20 is required to be disposed so that approximately 95% of drivers can view the display panel 20.

In this way, the vehicle according to the present embodiment can use, as a display device for a vehicle, both the HUD device 10 and the display panel 20 to display information. In this case, the HUD device 10 and the display panel 20 can display information independently of each other.

In general, information display using the HUD device 10 requires the driver to visually recognize information by displaying the information so as to overlap outer scenery. Accordingly, the HUD device 10 displays information so as not to obstruct visibility of the outer scenery. Therefore, the HUD device 10 is often unsuitable for clear and detailed display as compared with the display panel 20. Moreover, there is a situation in which information displayed by the HUD device 10 blends with the outer scenery depending on the color of the displayed information and is hard to a driver to view. For example, during driving on a snowy road, information displayed by the HUD device 10 blends with white scenery and is hard to view. As described above, the display panel 20 is sometimes further advantageous in terms of visibility of information than the HUD device 10.

In view of this, the present embodiment focuses on a difference in display form between the HUD device 10 and the display panel 20. As described below, information displayed by the HUD device 10 and information displayed by the display panel 20 are distinguished.

First Method

Information display using the HUD device 10 has an advantage of reducing the movement of the line of sight of a driver who is viewing the vehicle forward direction and allowing the driver to easily notice displayed information. In view of this, the HUD device 10 displays information that arouses driver's attention such as certain characters or symbols, road signs, or icons abstracting certain events. Meanwhile, the display panel 20 displays detailed information representing details of the information displayed by the HUD device 10. Because the display panel 20 is excellent in visual clearness and detailed display, the display panel 20 can display information that requires reading to the driver. With this arrangement, it is possible to arouse attention earlier by using the HUD device 10 and to compensate insufficiency of information displayed by the HUD device 10 by using the display panel 20, thereby displaying a larger amount of information to the driver.

Second Method

The display device 1 for a vehicle can display various kinds of information concerning the states of the vehicle. These kinds of information include essential information, which is required to be displayed to the driver. For example, the speed of the vehicle is required to be displayed to the driver by using a meter device or an alternative display device. The display panel 20 is more suitable for displaying this essential information than the HUD device 10 because the essential information needs to be viewed by the driver with certainty. In view of this, the essential information can be displayed on the display panel 20, and information other than the essential information can be displayed by the HUD device 10. An example of the information other than the essential information is navigation information representing a planned pathway along which the vehicle travels. With this arrangement, the display panel 20 presents the essential information to the driver with certainty and the HUD device 10 complements other information, thereby presenting a larger amount of information to the driver.

As described above, in the present embodiment, the display device 1 for a vehicle includes the irradiation unit 11 that projects display light L onto the windshield 4 through the opening OP and the display panel 20 (display section) that is disposed on the opening side surface 3b1 extending from the peripheral part of the opening OP toward the inner side of the instrument panel 3 and displays information to the driver.

In this arrangement, the display panel 20 is disposed on the opening side surface 3b1 which the driver views in front of the driver through the opening OP. Because the opening side surface 3b1 is covered by the display panel 20, the driver does not directly view the opening side surface 3b1. This makes it possible to make appearance better. Moreover, because the display panel 20 is provided, it is possible to display information in addition to information displayed by the HUD device 10. This makes it possible to display a larger amount of information to the driver. It is therefore possible to display a larger amount of information to the driver while suppressing deterioration in the vehicle interior design.

Furthermore, in the present embodiment, the opening side surface 3b1 has the groove 3c formed in a recessed shape, and the display panel 20 is disposed in the deep part of the groove 3c.

Because the windshield 4 is disposed above the opening OP, there is a possibility that light emitted from the display panel 20 disposed on the opening side surface 3b1 is reflected on the windshield 4 so as to overlap information displayed by the HUD device 10 or obstruct visibility of the outer scenery. In this respect, according to the present embodiment, because the display panel 20 is disposed in the deep part of the groove 3c, the display panel 20 is covered from above by the upper wall of the groove 3c, i.e., the hood 3d. It is therefore possible to prevent a situation in which light emitted from the display panel 20 is reflected on the windshield 4.

Figure 6:
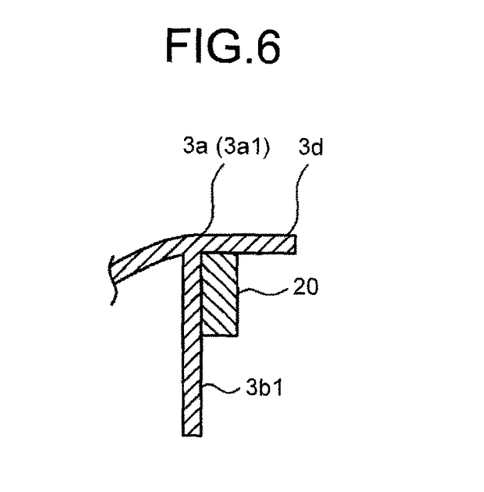
FIG. 6 is an explanatory view schematically illustrating a configuration of a hood.

In the present embodiment, the display panel 20 is disposed in the groove 3c in order to prevent light from the display panel 20 from being reflected on the windshield 4. However, it is also possible to employ a structure in which the display panel 20 is covered from above by the hood 3d that is constituted by a flat plate member protruding from the opening peripheral part 3a as illustrated in FIG. 6, instead of providing the groove 3c in the opening side surface 3b1.

Furthermore, in the present embodiment, the opening peripheral part 3a1 close to the front side of the vehicle is located higher than the opening peripheral part 3a2 close to the back side of the vehicle.

With this arrangement, it is possible to prevent a situation in which the opening peripheral part 3a2 close to the back side of the vehicle obstructs the line of sight of the driver viewing the display panel 20. This configuration allows drivers having various physical sizes to easily view the display panel 20 well.

Furthermore, in the present embodiment, the display panel 20 displays detailed information, i.e., information representing details of displayed information projected by display light from the irradiation unit 11.

With this arrangement, the kinds of information displayed by the HUD device 10 and the display panel 20 are determined in accordance with a difference in display characteristics between the HUD device 10 and the display panel 20. This makes it possible to arouse attention in a noticeable manner and to present information necessary for understanding the attention with good visibility.

Furthermore, in the present embodiment, the display panel 20 displays essential information among pieces of information concerning a state of the vehicle that is required to be displayed to the driver.

With this arrangement, it is possible to display the essential information with good visibility. This makes it possible to properly present information that must be displayed to the driver.

Figure 7:
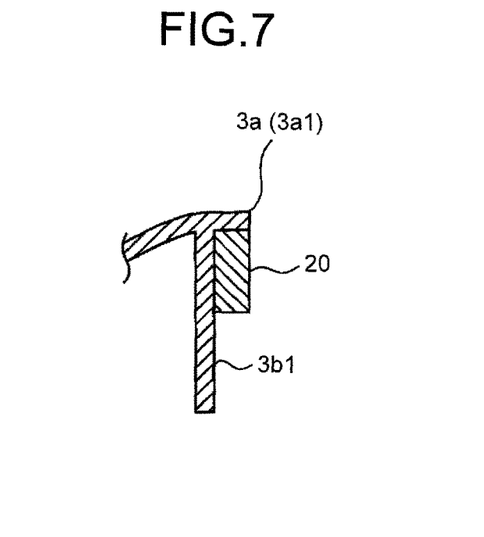
FIG. 7 is an explanatory view illustrating a relation between an opening peripheral part and an opening side surface.

In the present embodiment, the opening side surfaces 3b1 to 3b4 are directly connected to the opening peripheral part 3a. However, the opening side surfaces 3b1 to 3b4 may be provided within a certain distance from the opening peripheral part 3a, as illustrated in FIG. 7.

The opening side surfaces 3b1 to 3b4 according to the present embodiment are constituted as part of the instrument panel 3. However, the opening side surfaces may be independent of the instrument panel 3. For example, the opening side surfaces may be constituted by the housing case 14 that accommodates the irradiation unit 11 of the HUD device 10.

Figure 8:
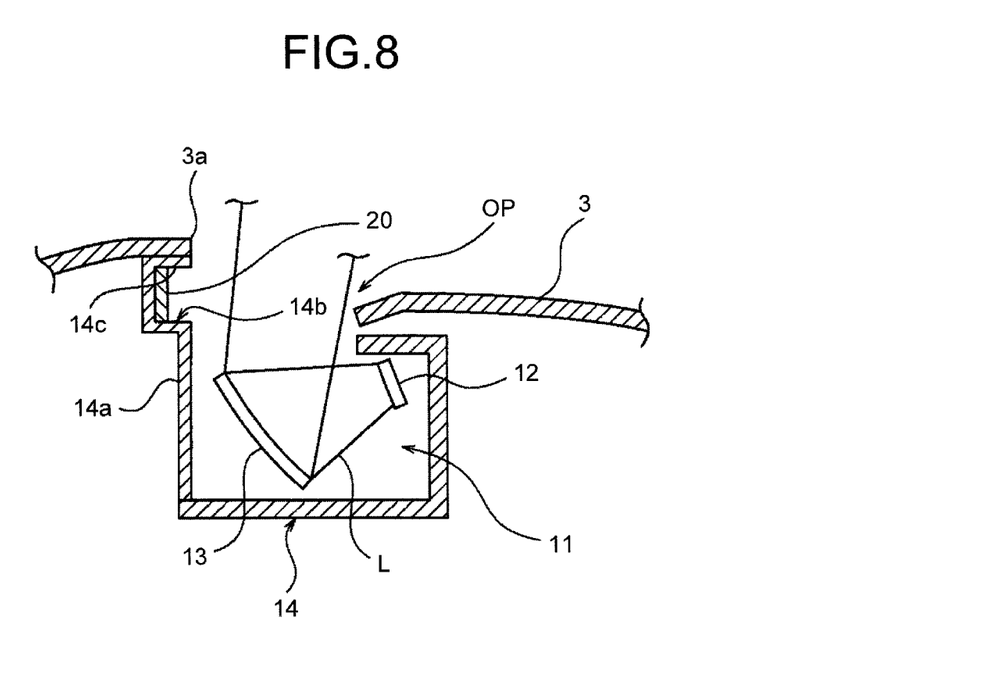
FIG. 8 is an explanatory view schematically illustrating an opening side surface constituted by a housing case.

FIG. 8 is an explanatory view schematically illustrating a state in which an opening side surface is constituted by the housing case 14. In the example illustrated in FIG. 8, an opening side surface close to the front side of the vehicle (corresponding to the opening side surface 3b1 in the above embodiment (see, for example, FIG. 3)) is constituted by a side wall 14a located close to the front side of the vehicle among the side walls of the housing case 14. Hereinafter, the side wall 14a is referred to as the "opening side surface 14a".

The opening side surface 14a extends from a lower part to an upper part of the instrument panel 3, and an upper end of the opening side surface 14a is located on the opening peripheral part 3a of the instrument panel 3. Note, however, that the upper end of the opening side surface 14a may be located within a certain distance from the opening peripheral part 3a as a base point.

As in the above embodiment, the display panel 20 is disposed on the opening side surface 14a. Specifically, an upper end part of the side wall 14a is bent so that a recessed groove 14b is formed. The display panel 20 is disposed in a deep part of the groove 14b. Provision of the recessed groove 14b forms an upper wall of the groove 14b, thereby providing a hood 14c that covers the display section 20 from above.

With this arrangement, the housing case 14 of the HUD device 10 can be used as the opening side surface 14a on which the display panel 20 is disposed. This configuration allows the HUD device 10 to be disposed near the instrument panel 3, thereby saving space.

In the example illustrated in FIG. 8, the opening side surface 14a located close to the front side of the vehicle is constituted by the housing case 14. However, the other opening side surfaces may be also constituted by the housing case 14. It is also possible to employ a structure in which the hood 14c is constituted by a flat plate member protruding from the opening peripheral part 3a and covers the display panel 20 from above, as illustrated in FIG. 6.

The vehicle and the display device for a vehicle according to the embodiment of the present invention have been described above. Obviously, the present invention is not limited to the above embodiment, and various modifications are possible within the scope of the present invention.

As described above, with the display device for a vehicle according to the present embodiment, information can be displayed by using a display section that is disposed in the vehicle forward direction from the opening of the instrument panel. Because this display section is located in front of a driver, the display section can substitute a meter device or a display device that displays meters and gauges. That is, a vehicle including the following elements (1) to (4) also functions as part of the present invention:

(1) a steering wheel which a driver operates, (2) an instrument panel disposed in the vehicle forward direction from the steering wheel, (3) an irradiation unit that projects, through an opening provided to the instrument panel, display light onto a reflection member facing the opening so as to display information to the driver, and (4) a display section that is disposed in the vehicle forward direction from the opening and that displays information to the driver.

With this arrangement, it is possible to provide a vehicle having excellent vehicle interior design.

The display device for a vehicle according to the present invention makes it possible to employ an arrangement in which the opening is provided in the vehicle forward direction from the meter device, and the display section is provided on the opening side surface of the opening.

In the above embodiment, display light is projected from the irradiation unit 11 onto the windshield 4. However, a reflection member onto which the display light is projected is not limited to the windshield 4. The display light may be projected onto other reflection members such as a combiner. It is also possible to employ a half mirror structure in which a transparent cover member that covers a front side of a meter device is used as a reflection member on which a virtual image is displayed. Note that the opening is located so as to face the reflection member, but the positional relation between the opening and the reflection member is not limited to a case where the opening and the reflection member face each other in parallel. It is only necessary that the opening and the reflection member face each other to such an extent that display light emitted through the opening is projected onto the reflection member.

In the above embodiment, an example in which an LCD is provided as the display section has been described. However, various types of members that display information to a driver such as a dial-type meter device having indicating needles, a fluorescent display tube, or a navigation device are also applicable as the display section.

With a display device for a vehicle according to the present invention, a display section is provided on an opening side surface. With this arrangement, the opening side surface can be hidden by the display section. Furthermore, information can be displayed on the display device in addition to information projected by an irradiation unit. This makes it possible to display a larger amount of information to a driver while suppressing deterioration in vehicle interior design.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device for a vehicle, comprising:
   an irradiation unit configured to project a first display light onto a reflection member through a single opening formed in an instrument panel of the vehicle, the opening facing the reflection member, and the irradiation unit configured to display information to a driver, the opening being defined by inner side surfaces of the instrument panel; and
   a display section configured to display information to the driver and disposed on a first inner side surface, the first inner side surface being one of the inner side surfaces of the instrument panel defining the opening formed in the instrument panel, the display section being disposed such that the driver views the display section through the opening formed in the instrument panel, wherein the irradiation unit comprises:
  a first display unit configured to emit the first display light, and
  a mirror configured to reflect the first display light emitted from the first display unit toward the reflection member and project the first display light onto the reflection member, and wherein the display section comprises a second display unit configured to emit a second display light, the second display unit being separate from the first display unit.

2. The display device for a vehicle according to claim 1, wherein
  the irradiation unit is disposed inside the instrument panel and the reflection member is located above the opening formed in the instrument panel, and
  the first inner side surface extends from the opening formed in the instrument panel toward a lower part of the instrument panel.

3. The display device for a vehicle according to claim 1, further comprising:
  a hood covering an upper part of the display section.

4. The display device for a vehicle according to claim 3, wherein
  a recessed groove is provided in the first inner side surface,
  the display section is disposed inside the recessed grove in a depth direction of the groove, and
  the hood is an upper side wall of the recessed groove.

5. The display device for a vehicle according to claim 1, wherein
  an upper end of the opening formed in the instrument panel closest to a front side of the vehicle is located higher than an upper end of the opening formed in the instrument panel closest to a back side of the vehicle.

6. The display device for a vehicle according to claim 2, wherein
  an upper end of the opening formed in the instrument panel closest to a front side of the vehicle is located higher than an upper end of the opening formed in the instrument panel closest to a back side of the vehicle.

7. The display device for a vehicle according to claim 3, wherein
  an upper end of the opening formed in the instrument panel closest to a front side of the vehicle is located higher than an upper end of the opening formed in the instrument panel closest to a back side of the vehicle.

8. The display device for a vehicle according to claim 4, wherein
  an upper end of the opening formed in the instrument panel closest to a front side of the vehicle is located higher than an upper end of the opening formed in the instrument panel closest to a back side of the vehicle.

9. The display device for a vehicle according to claim 1, wherein
  the display section displays information that is in association with the displayed information projected by the first display light from the irradiation unit.

10. The display device for a vehicle according to claim 2, wherein
  the display section displays information that is in association with the displayed information projected by the first display light from the irradiation unit.

11. The display device for a vehicle according to claim 3, wherein
  the display section displays information that is in association with the displayed information projected by the first display light from the irradiation unit.

12. The display device for a vehicle according to claim 4, wherein
  the display section displays information that is in association with the displayed information projected by the first display light from the irradiation unit.

13. The display device for a vehicle according to claim 5, wherein
  the display section displays information that is in association with the displayed information projected by the first display light from the irradiation unit.

14. The display device for a vehicle according to claim 1, wherein
  the display section displays information on a state of the vehicle, including at least a speed of the vehicle.

15. The display device for a vehicle according to claim 2, wherein
  the display section displays information on a state of the vehicle, including at least a speed of the vehicle.

16. The display device for a vehicle according to claim 3, wherein
  the display section displays information on a state of the vehicle, including at least a speed of the vehicle.

17. The display device for a vehicle according to claim 5, wherein
  the display section displays information on a state of the vehicle, including at least a speed of the vehicle.

18. The display device for a vehicle according to claim 1, wherein,
  the first inner side surface is an inner side surface of the instrument panel located closest to a front side of the vehicle.

19. The display device for a vehicle according to claim 1, wherein,
  the irradiation unit is accommodated in a housing case, and the first inner side surface is constituted by the housing case, and
  the mirror is an aspherical mirror.

* * * * *